J. Keane,
Water Closet,
Nº 26,995.    Patented Jan. 31, 1860.

Witnesses:
Samuel W. Serrell
Thos. Geo. Harold

Inventor:
John Keane

UNITED STATES PATENT OFFICE.

JOHN KEANE, OF NEW YORK, N. Y., ASSIGNOR TO HIMSELF AND W. H. BARTHOLOMEW.

WATER-CLOSET.

Specification of Letters Patent No. 26,995, dated January 31, 1860.

*To all whom it may concern:*

Be it known that I, JOHN KEANE, of the city and State of New York, have invented, made, and applied to use a certain new and useful Improvement in Water-Closets; and I do hereby declare that the following is a full, clear, and exact description of the construction and operation of the same, reference being had to the annexed drawing, making part of this specification, wherein—

Figure 1:
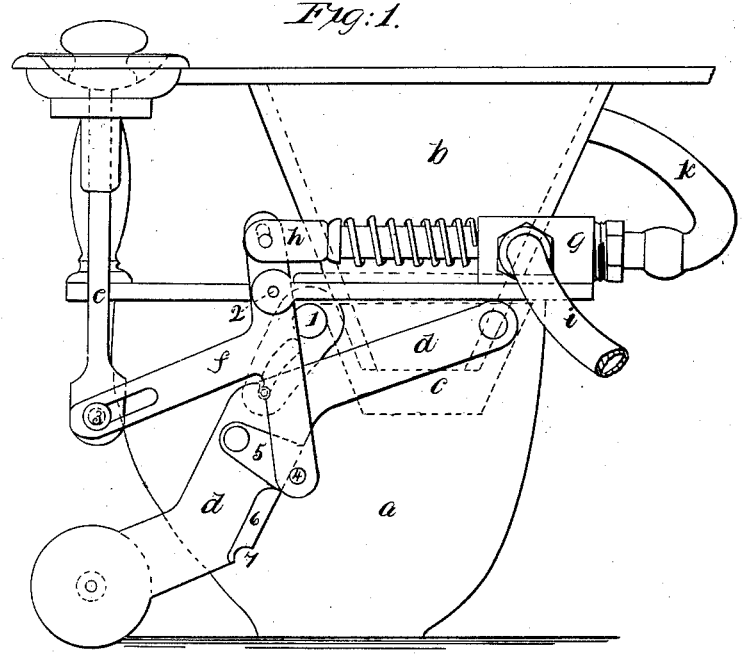
Figure 2:
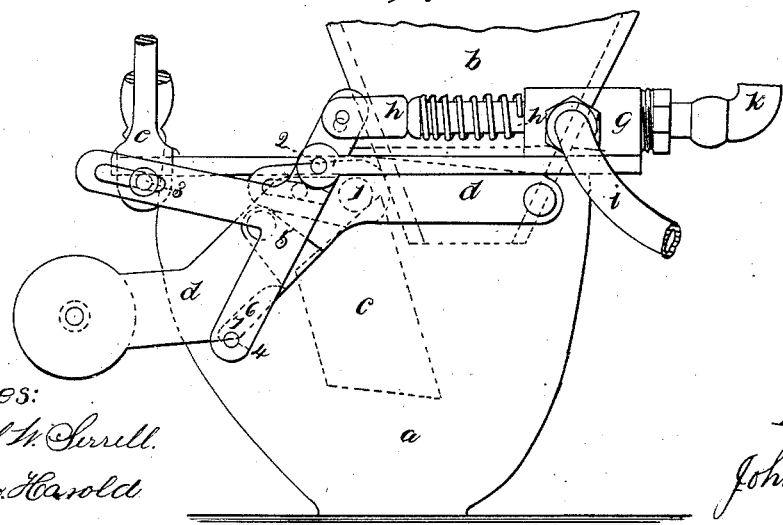

Figure 1, is a side view of my improved closet with the parts at rest, and Fig. 2, is a similar view with the pan dropped and the water running.

Similar marks of reference denote the same parts.

In the ordinary pan closet it has heretofore been usual to connect the pull to the lever that throws the pan, and from these parts give motion to the valve that supplies the water either from a cistern or service pipe. In this case the pan lever and pull are uniform in their movement and the closing of the pan and shutting off the water are simultaneous, and hence either a cistern or a gradual self closing cock are required with almost all pan closets to allow sufficient water to run into said pan to exclude smell.

The nature of my said invention consists in applying a separate and independent lever between the pull and the pan lever in such a manner that the pan can be thrown and emptied and retained in that position while the water is running or said pan allowed to close while the pull is still up and the water continues running, thus all cisterns and self closing cocks are dispensed with and a neat and durable closet produced, and one that is not liable to get out of repair.

In the drawing $a$, is the hopper of the closet, $b$, a portion of the basin $c$, is the pan shown by dotted lines, 1, is the spindle of said pan and $d$, is the lever. These parts may be of any desired character, or mode of construction. The lever $d$ however does not connect directly to the pull $e$, but I introduce the auxiliary lever $f$, set on a fulcrum 2, formed on any desired part of the closet, and to this lever $f$ the said pull is connected as at 3, or in any other convenient manner. This auxiliary lever $f$ connects to the pan lever by a latch of suitable character and also operates the cock or valve for supplying water. I have shown a pin 4, on this lever $f$, and a latch or gate 5, on the pan lever $d$, so that as said lever $f$, descends the pin 4, passes below and raises the gate 5, which dropping behind it forms a continuous surface with the flange 6, so that upon pulling on $e$, the pin 4, lifts the lever $d$, emptying the pan, and said pin sliding on 6, arrives at the notch 7, and this dropping over the pin 4, holds both the pull up, and the pan dropped while the water is running and the slightest movement in raising the pull $e$, draws pin 4, out of the notch 7, and the pan lever falls raising the pan up into place to be filled with water that is still running in consequence of the pull being elevated. The cock or valve made use of may be any desired character, and suitably connected to the lever $f$. I have shown a cock at $g$ with a rod $h$, to an arm of the lever $f$.

$i$, is the pipe supplying water and $k$ is the pipe to the deflector of the closet basin.

Having thus described my said invention what I claim and desire to secure by Letters Patent is—

The auxiliary lever $f$, operating the cock or valve that supplies water to the closet, when combined with the pan lever $d$ and pull $e$, substantially as specified.

In witness whereof I have hereunto set my signature this ninth day of January 1860.

JOHN KEANE.

Witnesses:
  LEMUEL W. SERRELL,
  THOS. GEO. HAROLD.